United States Patent [19]

Heisler

[11] Patent Number: 4,676,361
[45] Date of Patent: Jun. 30, 1987

[54] TROUGHING CONVEYORS FOR CARTON OR BAG ORIENTING AND CONVEYING

[76] Inventor: Raymond A. Heisler, 657 Dakota Trail, Franklin Lakes, N.J. 07417

[21] Appl. No.: 772,264

[22] Filed: Sep. 3, 1985

[51] Int. Cl.⁴ .............................................. B65G 47/24
[52] U.S. Cl. .................................... 198/394; 198/415; 198/463.4; 198/464.2; 198/817
[58] Field of Search ............... 198/394, 395, 411, 415, 198/441, 455, 460, 463.4, 464.1, 464.2, 464.3, 464.4, 817, 818, 822, 830, 833, 835, 823, 860.1, 861.1, 861.2, 826

[56] References Cited

U.S. PATENT DOCUMENTS

| | | | |
|---|---|---|---|
| 2,662,633 | 12/1953 | Kingsley | 198/389 |
| 2,813,617 | 11/1957 | Sheetz | 198/415 X |
| 3,047,123 | 7/1962 | McKay | 198/415 |
| 3,251,452 | 5/1966 | Conway et al. | 198/460 |
| 3,717,751 | 2/1973 | Fluck | 198/503 X |
| 3,866,740 | 2/1975 | Greathead | 198/460 |
| 4,149,621 | 4/1979 | Sollenberger et al. | 198/395 |
| 4,231,465 | 11/1980 | Bourgeois | 198/460 |
| 4,355,712 | 10/1982 | Bruno | 198/460 |
| 4,556,142 | 12/1985 | Lapeyre | 198/822 |

FOREIGN PATENT DOCUMENTS 0219712 3/1985 German Democratic Rep. ................................. 198/415

Primary Examiner—Robert J. Spar
Assistant Examiner—Lyle Kimms
Attorney, Agent, or Firm—Ralph R. Roberts

[57] ABSTRACT

This invention pertains to a troughing conveyor for products such as bags, boxes, cartons and the like. It is anticipated that products of like configuration and initial orientation are carried to an orienting conveyor means. This conveyor system has a stop plate that is actuated as and when required to insure that an oriented product has exited the system before entrance of another product to said system. Two plate-like conveyors are arrayed in tandem and are of like size and extent. These conveyors are troughed to provide a shallow included angle and the upper extents are also formed with convex arc so that the product is transported on two points. Each of these conveyors is independently driven by variable-speed gear motors, each with computer programs controlling the speed of each of the conveyor extents. An electric-eye counter device insures that an oriented product has exited the system before another product has been delivered. Orienting of the product may require a speed-up, stop or reverse at times of one or both conveyor movements. The needed actuation is determined and then a program for each conveyor is provided. A new product in size, configuration or initial orientation may require a new program for each conveyor motor.

25 Claims, 5 Drawing Figures

TROUGHING CONVEYORS FOR CARTON OR BAG ORIENTING AND CONVEYING

BACKGROUND OF THE INVENTION

1. Field of the Invention

With reference to the classification of art in and as established by the U.S. Patent Office, this invention is believed to be found in the general class entitled "Conveyor, Power-Driven" (Class 198) and more particularly in the subclass entitled "by plural, unequal-speed members, simultaneously contacting and conveying items." In this same general class, attention is also directed to plate-type conveyors having "formed or including transverse plates tandemly disposed lengthwise of carrier belt."0 In particular, this invention discloses plural plate-type conveyors arrayed in a troughed relationship and with each conveyor moved at selected speeds in response to an electronic detector which feeds the initial information to a computer which ascertains the desired position or orientation. When positioned, the carton, box or bag is delivered to a receiving conveyor. Only one carton, box or bag is on the troughing conveyor system at one time.

2. Description of the Prior Art A careful pre-Ex search was conducted in the U.S. Patent Office and some of the many conveyor systems are noted and are called to the Examiner's attention. Among the several conveying systems are U.S. Pat. No. 3,047,123, as issued to McKAY on July 31, 1962, and although providing parallel plate conveyors for precise orientating as shown in FIG. 9 thereof, does not show or suggest troughed conveyors with the upper surfaces disposed in a convex arc and with detectors to adjust the speed and direction of flow of each extent of conveyors. U.S. Pat. No. 2,813,617 to SHEETZ, as issued Nov. 19, 1957, illustrated two troughed conveyors using V-belts to bring round fruit such as apples to a single-file array. Orienting is not contemplated nor is a plate-like onveyor with a selective speed as determined by a detector and computer.

U.S. No. 3,603,446 to MAXEY et al, as issued Sept. 7, 1971, pertains to sheet straightening and sensing means which is provided to engage one edge as and until the other edge becomes aligned with the leading edge. Plate-like conveyor construction is well known and is exemplified in U.S. Pat. No. 3,162,295 to ADAMSON, as issued Dec. 22, 1964, and U.S. Pat. No. 3,233,722, as issued to JORGENSEN on Feb. 8, 1966.

Recent developments in automatic and semi-automatic packaging equipment often require that cartons or boxes, sealed or unsealed, be presented in a determined attitude or position and at relatively high speed. This equipment is actuated usually for imprinting the box with a logo, identification and often instructions. These functions and equipment are required for a variable size box, container or package. Some of the present articles are in bags which also require precise orienting. Rotation to present flaps for sealing, printing or other operations requires sure and foolproof apparatus. The usual approach to the problem of turning the box, carton or bag is to provide an automatically-operated turntable in combination with the conveying line or system for advancing the articles.

Turntable usage, however, limits the speed and versatility of a delivery system. This may be because of the weight of the container, size of the container or possible randomness in positioning. Turntables require a sufficient time interval for the support platform to lift, receive the product or carton and rotate and turn the product to the desired position and then lower the turntable out of way of the delivery conveyor. In addition, considerable and complicated mechanism and apparatus must be provided to grasp the positioned cartons or products and coordinate the action of this apparatus with the rest of the system or line.

In the present invention, the utilizing of two plate conveyors with individual speed driving controls eliminates the problem of turntables. The delivery to the end of this turning section provides a net speed of movement of one conveyor extent with the other conveyor extent so that turning is achieved during advancement of the carton or product.

SUMMARY OF THE INVENTION

This invention may be summarized, at least in part, with reference to its objects. It is an object of this invention to provide, and it does provide, a box, carton or bag orienting and conveying system, and more particularly to troughed plate-like conveyors which are made with a convex arc or arch so as to present a single contact point to provide a defined engagement axis.

It is a further object of this invention to provide, and it does provide, a rotating and orienting conveyor system in which two plate-like conveyors are independently moved in response to generated signals sent from a detector, thence to and through a computer which evaluates this information and from this information commands the right or left conveyor extents to move so as to produce the desired orientation, after which the conveyors are brought to equal speed and the product is delivered in the desired orientation to a discharge conveying or transporting system in the desired oriented position.

It is still a further object of this invention to provide, and it does provide, dual conveyor apparatus with individual drive control means moving the two conveyor systems at relatively high speed and with the upper extents of these conveyors not only troughed, but crowned so the product is locally engaged. During transport in the desired direction and while advancing a carton, there is a rotating of said carton or bag so as to discharge this carton or product at the desired position. Only one carton or product is on this extent of orienting apparatus at any particular time. The speeds of the two belts are adjusted to accommodate the particular carton or product on the orienting conveyor apparatus. This conveying system provides considerable flexibility in accommodation in size of the container or product. It is noted that although two conveyor extents are used, they are equal in length and in tilt angle that provides the trough.

In addition to the above summary, the following disclosure is detailed to insure adequacy and aid in understanding of the invention. This disclosure, however, is not intended to cover each new inventive concept no matter how it may later be disguised by variations in form or additions of further improvements. For this reason, there has been shown a preferred embodiment of troughing oonveyors as adopted for use in orienting products such as boxes, cartons or bags. This specific embodiment has been chosen for the purposes of illustra:ion and description as shown in the accompanying drawings wherein:

EMBODIMENT OF FIG. 1

Figure 1:
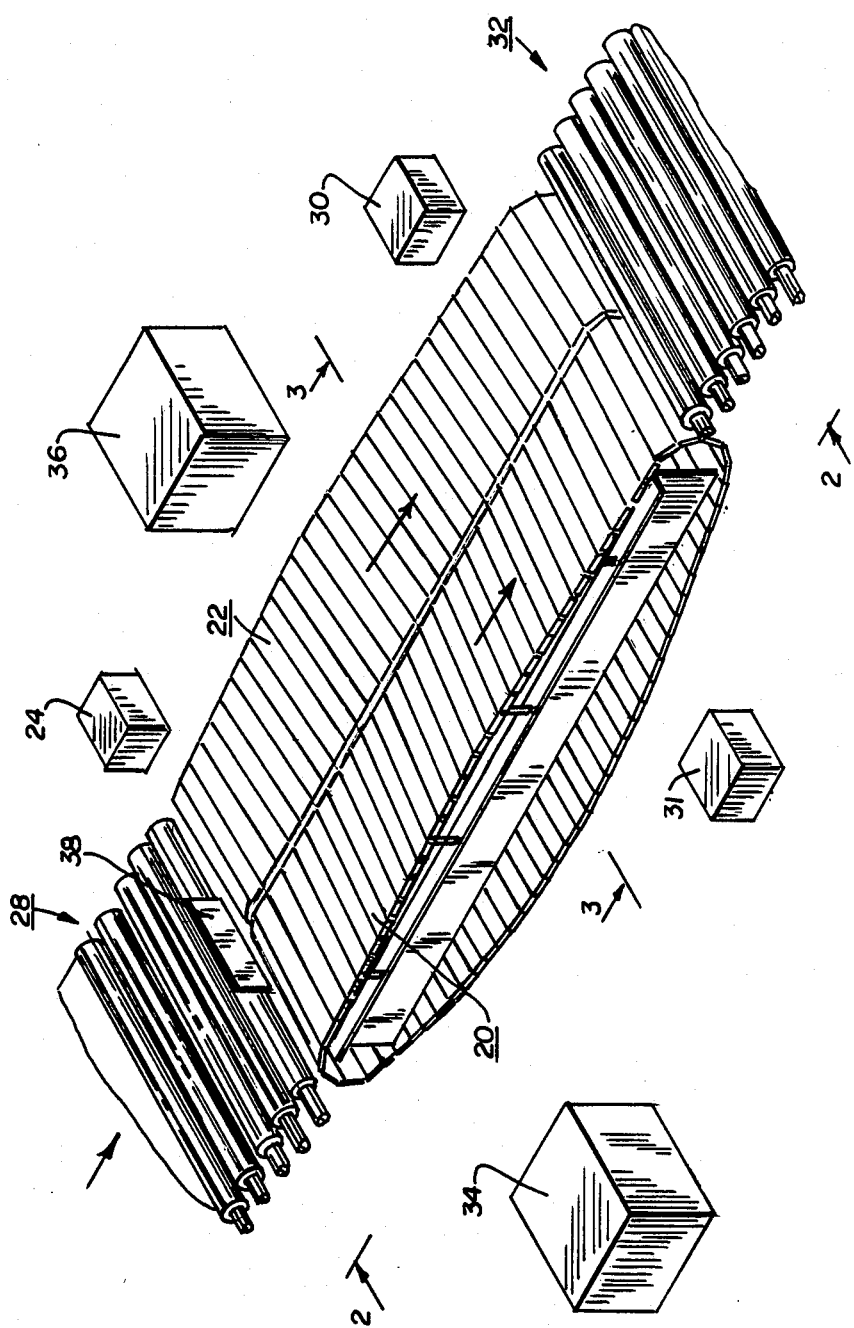
FIG. 1 represents an isometric view, partly diagrammatic and fragmentary, and showing the troughed conveyor apparatus of this invention.

Referring next to the drawings, there is depicted in FIG. 1 a pair of troughed conveyors for precisely orienting the product which may be a carton, box or bag. As shown, there is provided a pair of plate-like conveyors connected so as to be in endless assembly. These conveyor extents are of sufficient length to receive and rotate the product to provide the desired orientation and after rotating the product to the desired position, then to advance and discharge the product from the conveyor section. As only one product can be placed on the orienting conveyor at one time, the length of this troughing conveyor is made as short as practical. This length is usually eight to ten feet, although this extent is not critical.

As seen in particular in FIG. 1, there are shown side-by-side plate-like conveyors 20 and 22 which are assembled to provide an endless extent. The upper reach of each conveyor is arched in a convex manner so as to have the center elevated which provides tangent contact of the product with each conveyor. These conveyors are also troughed at a shallow included angle of substantially like and equal angles formed by tilting the upper extents of each plate-like conveyor from an outer edge of the conveyor so that the pair of side-by-side conveyors forms a V-shape. These troughed upper extents are at preferred selected angles of about two to six degrees from a horizontal extent. The arch of the upper extent is about two to four inches, but this may be adjusted to suit the particular installation and product. The lower extent of the plate-like conveyor is allowed to drape down with the natural weight of the flights providing a desired tension. Preferably, the plates used in these conveyors are of plastic, but this is only a matter of preference.

Still referring to FIG. 1, the troughing conveyor has a counting device or deteotor shown by a box diagram 24. This counter is electronically actuated and connection to the control system is not shown. This counter 24 is positioned to numerically count and determine the presence and delivery of a product 26 (FIG. 2) whether a box. carton or bag. This product is delivered from a supply conveyor, generally identified as 28. This conveyor is conventionally supplied by the customer and may be a powered roller-type or may be a belt conveyor. This conveyor selection and construction is merely a matter of preference. After rotating the product 26 on this troughing conveyor. another detector system is positioned at the exit end thereof. An electronically-actuated system, which conventionally includes an electric eye and beam 30 and 31, is positioned to insure that the oriented product has exited the troughed conveyor extent and has been further moved and transported by an exit transporting conveyor, generally identified as 32. As noted for conveyor 28, this exit conveyor 32 is conventional and is usually customer-provided.

Also shown in FIG. 1 and identified by box diagrams are right and left electronic controls 34 and 36. These controls are usually specifically for receiving information from a program as provided by a microprocessor or computer, not shown. The computer or microprocessor is customer-provided and is conventional. The program or programs which provide the electronic signals to the controls 34 and 36 are written to acommodate the size and configuration of the product 26 as delivered to the upper flights of conveyors 20 and 22. No patentable distinction is ascribed to the computer, microprocessor, program or programs as these will be at the discretion of the customer and the desired input and output orientation. Usually a great number of products 26 are of a like size and are delivered by the supply conveyor 28 with substantially like orientation. This repetition of circumstances is a consideration for establishing a program for the precise actuation of the conveyor sections 20 and 22. This showing of FIG. 1 anticipates repetitive performance on like-sized and -shaped products. If needed, additional detectors may be placed above the troughing conveyor extents 20 and 22 to receive randomly-sized and -shaped products and adjust the speed of one or the other conveyor to provide the desired orientation for each product. This additional detection is usually not provided as delivery is of like products and is usually from a discharge source such as a depalletizer or the like.

To insure and prevent a product 26 from entering and being carried on the troughed conveyors 20 and 22 while an immediately prior product is still on these conveyor sections, there is provided a stop member 38 that is powered by means not shown. This stop member is usually below and between the infeed conveyor 28 the orienting conveyors 20 and 22 and is only actuated (lifted) when a prior product 26 on the orienting conveyors has not exited as determined by the counting device 30 and 31. Use of this stop member 38 prevents a jam-up that may be caused by unforeseen factors such as a rupture, a carton or box improperly constructed or other problems. The mechanism to bring stop member 38 in way of an advanced product is contemplated to be a lift mechanism that is only actuated in response to a signal to lift. In normal processing of products, this stop is not required or desired.

EMBODIMENT OF FIGS. 2, 3 AND 4

Figure 2:
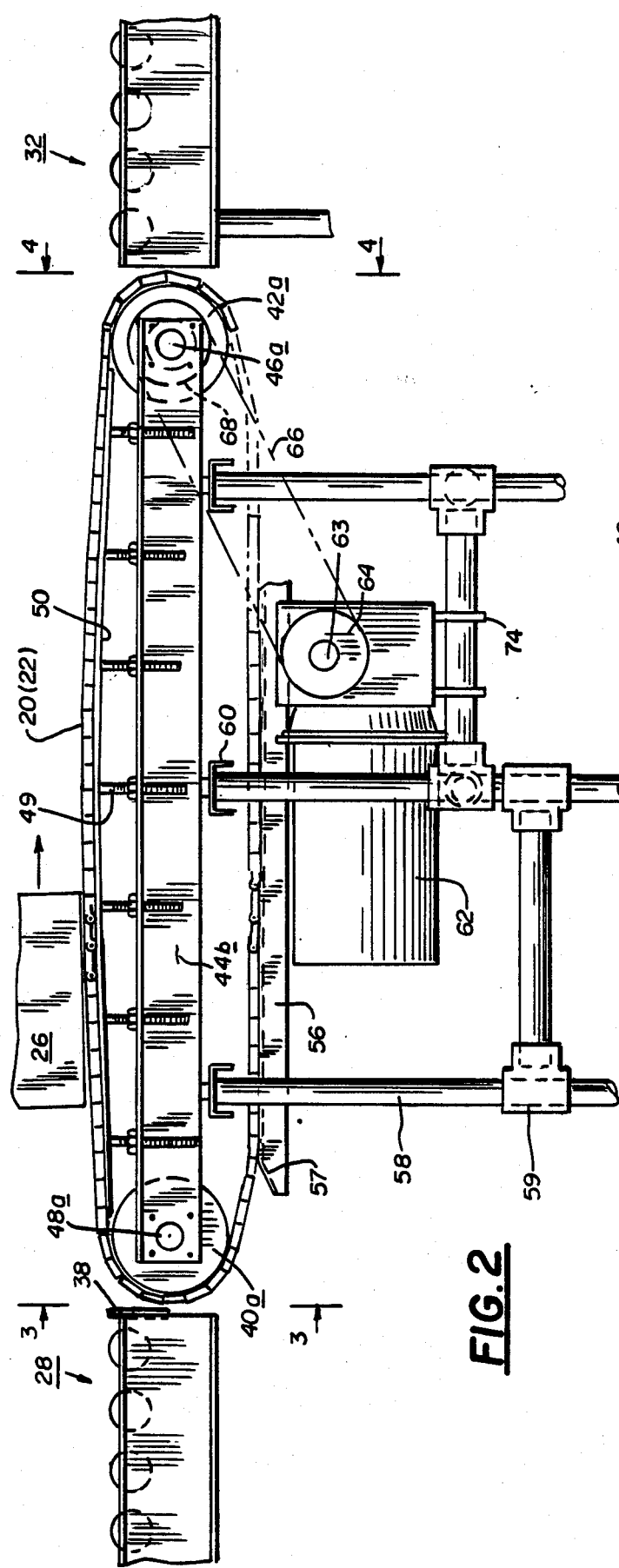
FIG. 2 represents a side view, partly diagrammatic and fragmentary, of this troughed conveyor apparatus, this view taken on the line 2—2 of FIG. 1 and looking in the direction of the arrows.

In FIG. 2, the troughing conveyors and associated components are shown in a more-or-less diagrammatic fashion. As depicted, the conveyor extents 20 and 22 on their top travel from left to right. The product 26 is carried by the infeed conveyor 28 to the troughing conveyor sections 20 and 22. Stop member 38 is in a non-obstructing or no-stop position. The product is delivered to this orienting assembly which is diagrammatically depicted in this view as having pulleys 40a and 42a which carry the near conveyor 20. Like pulleys 40b and 42b are similarly provided to carry the conveyor 22. As seen in FIG. 2, a supporting angular rail 44 a is used and as seen in FIG. 4, there are four angular rails which are identified as 44a, 44b, 44c and 44d and these extend the full length of the conveyors. These four rails are disposed so as to not only act as the strength members, but are also adapted to carry a driven shaft. The near conveyor 20 has a driven shaft 46a and the conveyor 22 has driven shaft 46b. These shafts are carried in flanged anti-friction bearings 47 (FIG. 3) attached to two rails. There are two other shafts 48a (FIG. 3) and 48b (not identified) which carry each conveyor extent. These conveyors are canted and operate at differential speeds for a purpose hereinafter described.

As seen in FIG. 2, the upper extent of each plate-type conveyor 20 or 22 is arched by using a multiplicity of screw jacks 49 which are adjusted to bring a support plate 50 to the desired arch. As reduced to practice, this orienting conveyor section is about ten feet long and is arched upward about two to three inches at the center.

Figure 3:
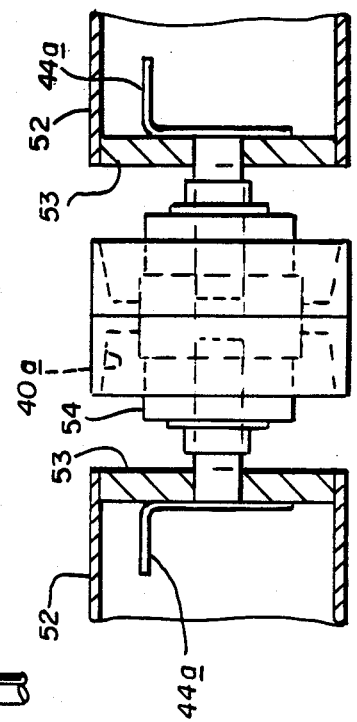
FIG. 3 represents a small, fragmentary end view in an enlarged scale and showing a tail pulley and arcuate guard or guide used with and for a conveyor of selected width which is supported by the arcuate guards or guides, this view very diagrammatic and taken on the line 3—3 of FIG. 2 and looking in the direction of the arrows.
Figure 4:
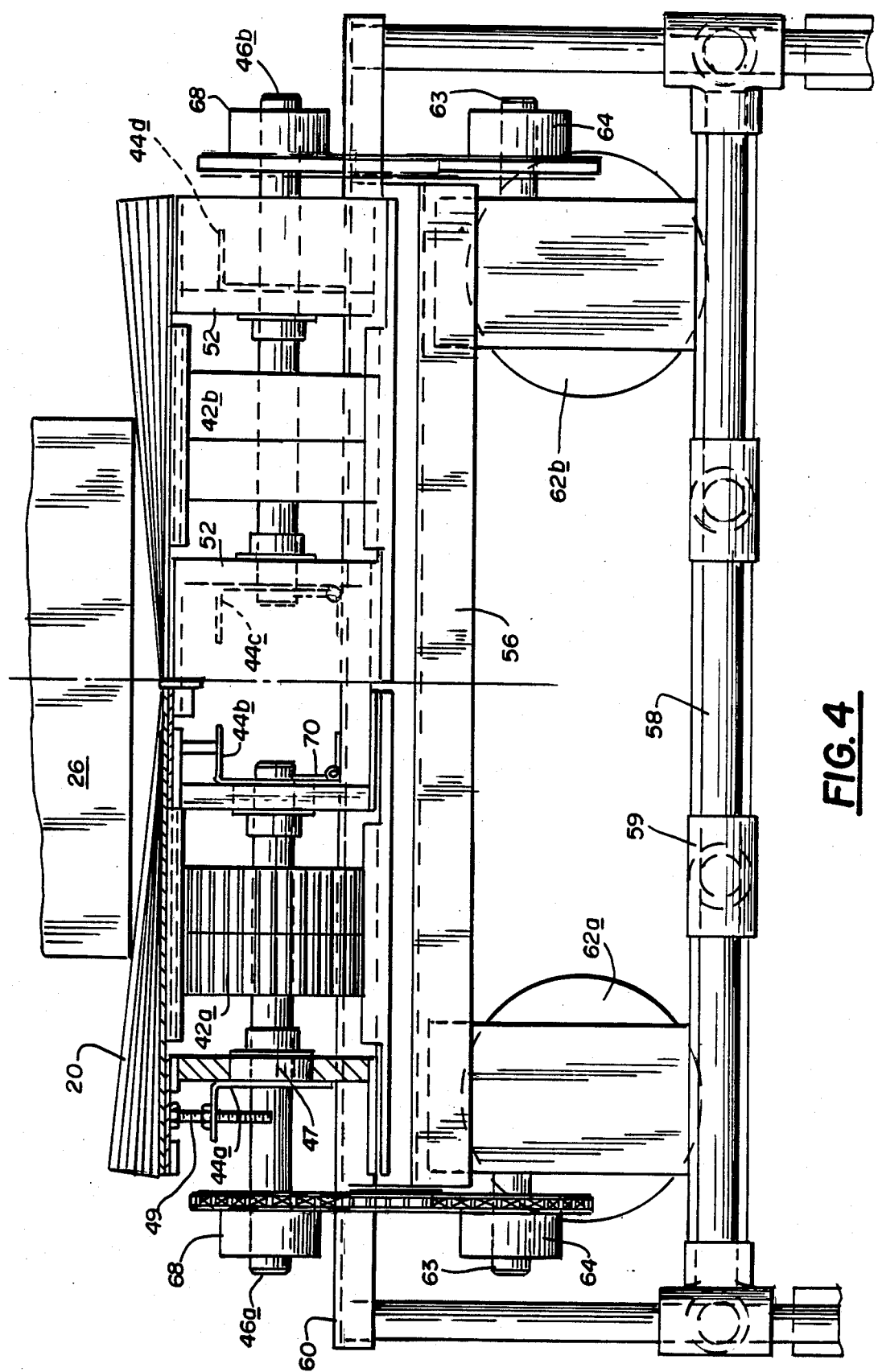
FIG. 4 represents a transverse view, very diagrammatic, and showing the relationship of the canted conveyors, with this view in a slightly enlarged scale to more clearly illustrate the hinge for each troughed conveyor and the supporting frame.

As seen in FIG. 3, these conveyors 20 and 22 are guided and supported at their ends by arcuate guards or guides 52 which are disposed to engage the inner surface portions of the endless plate-type conveyors 20 and 22 to insure their smooth transitional movement from the top to the bottom extent. While still looking at FIG. 3, it is to be noted that guides 52 have a support member 53 which is secured to the appropriate rail portion 44 by screws or the like. The guards or guides 52 extend outwardly and are movable with these rails 44 as they are adjusted to accommodate the width of the conveyors. It is also to be noted that the pulleys 40 and 42 may be made narrower or wider by means of screw-secured hubs 54 as carried on a designated shaft.

Referring again to FIG. 2, it is noted that there is diagrammatically depicted an underextent of the conveyor which is allowed to drape to and is slideable on the return run support 56. This support is shown as a channel member with a deflecting inlet end portion 57. The support frame or means is depicted as of pipe and Tee-connectors 58 and 59, with transverse channels 60 providing the top support for the conveyors. Carried by this support frame is a reversible gear motor 62 having an output shaft 63 on which is secured a toothed sprocket 64. A positive drive means such as a roller chain or timing belt 66 extends to a driven sprocket 68 secured to and carried by the shaft 46a (FIG. 2). Not shown but contemplated are chain guards which are intended to insure compliance with any and all safety regulations. Not shown are electrical conduit means from control 34 to the gear motor 62.

In FIG. 4 there is shown a diagrammatic representation of the troughed conveyor system. The product 26 is depicted as a box which is shown supported at two ends by the top extents of conveyors 20 and 22. The central portion of this apparatus is contemplated to be symmetrical around a center line. Shafts 46a and 46b are driven shafts, with the outer extents or ends of these shafts carrying like secured sprockets 68. These sprockets are rotated in response to actuation of an associated gear motor 62a or 62b. As depicted in FIG. 4, the left gear motor is identified as 62a and in response to signals from controller 34 turns shaft 63, sprocket 64 and the driven sprocket 68 at a selected speed and direction. The chain or timing belt 66 is not shown nor is a safety guard for such a drive. The right gear motor is identified as 62b and is actuated in response to signals from controller 36. This right gear motor rotates shaft 63, sprocket 64 and driven sprocket 68. In this drive there is likewise not shown a chain or timing belt, nor is there illustrated a safety guard although required guards are provided for all operations.

As FIG. 4 is partly diagrammatic and looking from the head or driven end, the right half is shown with guards 52 (FIG. 3) in position. As these conveyor top extents of the troughed conveyors and 22 are canted to form a quite shallow "V," each of the inner rails 44b and 44c is carried by a hinge 70 which has its transverse leaf secured to channel member 60. Shafts 46a and 46b are separately rotated and do not extend inwardly much more than rails 44b and 44c. It is to be noted that both the driven and follower shafts for the conveyors 20 and 22 are carried in flange bearings 47 secured to the rails.

As seen in FIG. 4, the inner and outer rails are adjusted to the desired position by screw threads in jacks 49 and after positioning are fixedly secured by nuts on the screw threads. As depicted, the conveyors 20 and 22 are movable from a horizontal position to a slope of about six degrees. The conveyors are contemplated to be of rigid molded plastic which have their midportions of each flight adapted to be engaged and moved by the pulleys 42a and 42b and with the other end carried by tail pulleys 40a and 40b. The degree of slope is a matter of selection and the arch provided is usually about two to four inches at the midpoint of the top conveyor extent.

DESCRIPTION OF FIG. 5

Figure 5:
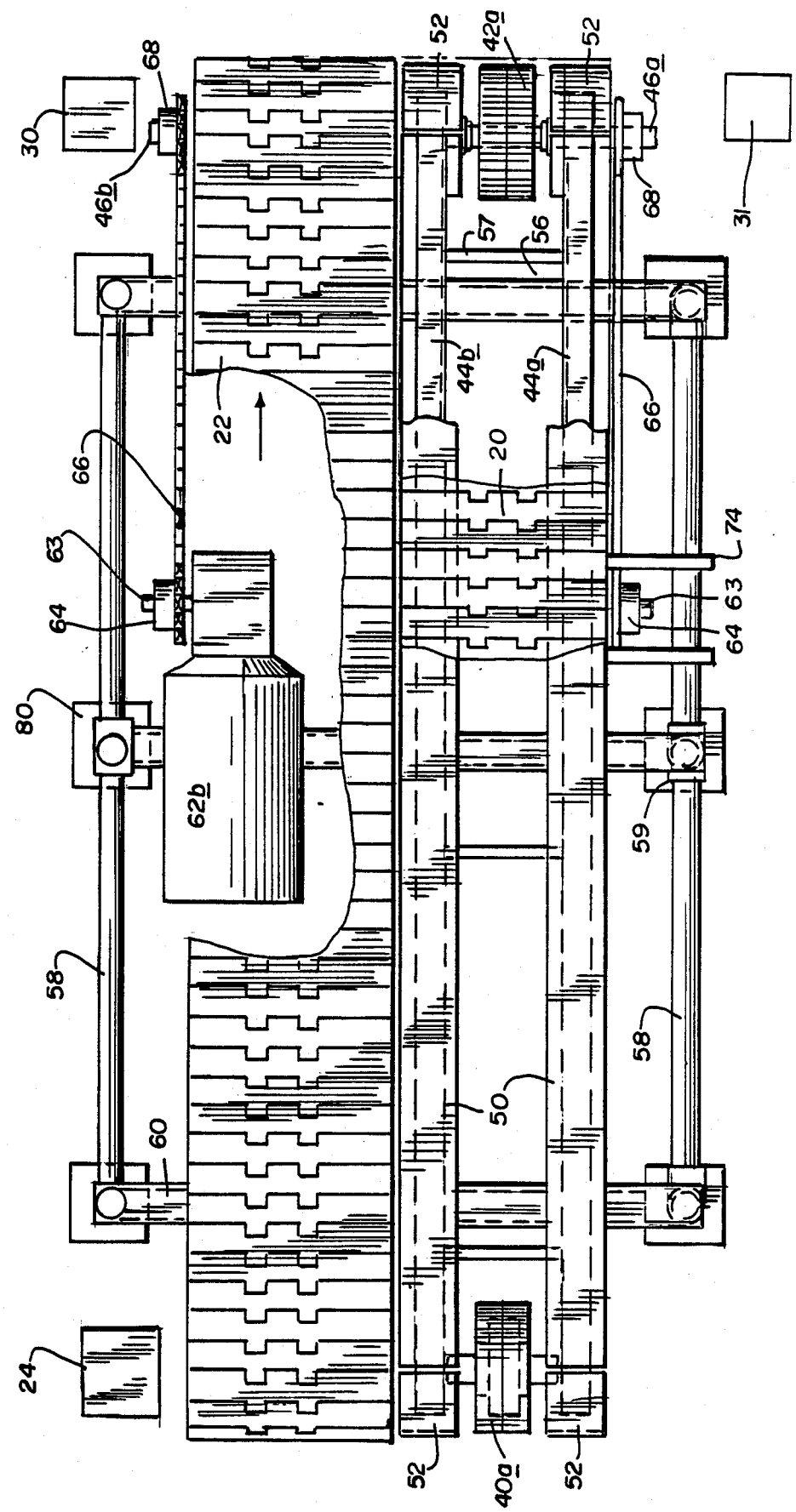
FIG. 5 represents a partly diagrammatic plan view of the troughed conveyors of FIG. 1, this view having a small portion removed to show a gear motor drive and with portions of the other conveyor deleted to show associated components, this view in a scale about 1½ that of FIG. 2.

Referring next, and finally. to the showing of FIG. 5, there is very diagrammatic showing and plan view of the troughed conveyor appratus of this invention. This plan view provides a depiction of the relationship of the several components. Conveyor 22 is shown partly broken away to illustrate the placement of the reversible, selectively-actuated and rotated gear motor 62b which through shaft 63 and sprocket 64 drives belt or chain 66. This belt or chain 66 is carried and drives sprocket 68 and the associated shaft 46b. Although the gear motor 62b is fixedly secured to the pipe support 58 by strap means 74, there is sufficient flexibility in the belt or chain 66 to allow shaft 46b and, in a like manner, shaft 46a, to be canted at a small angle.

As seen in this plan view, the two plate-type conveyors are in parallel array and are conventionally link-connected. The outer extents are carried by and on support plates 50. These are carried and arch-positioned by jacks 49 as seen in FIGS. 2 and 4. Rails 44a and 44b are shown for conveyor 20, but like rails 44c and 44d are seen in FIG. 4. The end guards and guides 52 are also shown in a diagrammatic fashion. These as seen provide a half circle support and are conventionally carried by the associated rail and may be moved in or out to accommodate the width of the conveyors used. The drive pulley 42a (head) is adapted to receive, guide and be rotated by the force from the gear motor. Also seen in this view are support pads or plates 80 which are at the bottom of the tubular frames 58. These plates allow the apparatus to be carried on a floor, not shown.

USE AND OPERATION

The orienting conveyor system and apparatus as shown and described above is diagrammatic in its arrangement in that the troughed conveyor system must, at least in part, be an individually-designed apparatus. The customer conventionally supplies the infeed conveyor 28 and discharge conveyor 32. These are power conveyor systems and between them is positioned the troughed conveyor and orienting system of this invention. Although the troughed conveyors are adapted to receive and orientate bags, boxes or cartons, established gross side is usually determined so that the width and carrying capability of the conveyor is established. If bags are to be delivered, the weight and sized are determined and the stop member 38 is so constructed to accommodate this product.

The products presented for orienting to a desired position are usually delivered from a source that includes mechanical delivery at a relatively constant high speed. This delivery is usually of substantially alike products with the configuration of the product substantially alike. The desired positioning of the delivered product to conveyor 32 is determined by the customer. The infed product is delivered to the troughed conveyor in a, more or less, determined orientation and the conveyors 20 and 22 at the time of receipt are traveling at the same rate of speed (left to right). The counter or detector 24 ascertains the receipt of the product on the top extents of these two conveyors. A computer controlled by a program sends signals to electronic controls 34 and 36 which then cause the conveyor top extents to move in a controlled speed and direction. These controls 34 and 36 are programmed so that generally the product is moved to the right end of the conveyors to deliver the now-oriented product to conveyor 32.

The program control as discussed above sends signals to the variable-speed, reversible gear motors so that in general a left-to-right movement is provided, but where and when required or desired the gear motor may move the conveyor in a oounterflow direction to more rapidly achieve a desired turning actuation. The detector, with a receiver and beam, exemplified by the boxes of 30 and 31, insures that the oriented product has exited the conveyor system before another to-be-oriented and subsequent product is brought to and on the troughed conveyors. The stop member 38 insures that only one product 26 is on the troughed conveyor apparatus at any given period of time.

The arch provided by the multiplicity of jacks 49 insures that the upper extends of conveyors 20 and 22 are arched to the extent desired. This arch insures that the outermost portions or edges of the product are engaged during the orienting actuation. Rails 44a, b, c and d are carried by the channel members 60. Rails 44b and c provide a fixed support of the hinge members 70. This hinge is shown in FIG. 4 and there are several hinges for each rail or, if desired, a piano-type hinge may be provided for each rail. This hinge provides selective adjustment of this apparatus. To establish the initial trough and arch, the hinges 70 permit each of the rails 44b or c to be elevated and arched, with the conveyor portions 20 and 22 brought to a selected attitude. The jacks 49 are adjusted so as to bring the top extents of the conveyors into the desired position. It is to be noted in FIG. 4 that rails 44a and d are a small distance above channel 60 which carries the hinge 70. After adjustment has been made, these outer rails are preferably secured to the channels 60 by means not shown.

Since the shafts 46a, 46b, 48a and 48b are not connected and are moved separately, any misalignment because of said hinges 70 does not affect the rotation capability of the shafts. The shallow "V" established by the troughed conveyors and the angled motion of said shafts are not sufficient to affect the efficiency of the flexible drive whether by a roller chain or timing belt. The usual slope of the conveyors is two to four degrees and the infeed and exit ends of these conveyors where canted are usually not great enough to affect the product path, but it is noted that the design of the apparatus permits a small amount of twist to be made in this orienting apparatus.

Terms such as "left," "right," "up, " "down, " "bottom," "top, " "front," "back," "in," "out" and the like are applicable to the embodiment shown and described in conjunction with the drawings. These terms are merely for the purposes of description and do not necessarily apply to the position in which the orienting and troughing conveyor may be constructed or used.

While a particular embodiment of the troughing conveyor has been shown and described, it is to be understood that the invention is not limited thereto and protection is sought to the broadest extent the prior art allows.

What is claimed is:

1. A troughing conveyor system for receiving a product such as a bag, box, carton and the like, and orienting said received product, one at a time, and delivering said product in a desired oriented condition to an exiting receiving conveyor, said troughing conveyor system including:
    (a) an infeed conveyor adapted to receive a product and deliver said product to said troughing conveyor system;
    (b) inhibiting means at the end of the infeeding conveyor to prevent unwanted delivery of a product to the troughing conveyor system prior to a discharge of an immediately prior product from said troughing conveyor system, said inhibiting means activated only when unwanted delivery of a product is present;
    (c) a support means for said troughing conveyor system;
    (d) a pair of substantially like plate-type conveyors arranged in an endless extent and in side-by-side array, these conveyors moved independently of each other by reversible gear motors and an associated drive means;
    (e) means for troughing the upper extents of said plate-type conveyors, said troughing resulting in a shollow included angle of substantially like degrees, the troughing formed by tilting each plate-type conveyor from an outer edge of the conveyor so that the pair of conveyors forms a V-shape;
    (f) means for providing a convex arc in each upper extent of conveyor so that the product is engaged at a localized point;
    (g) means for guarding the drive apparatus and for carrying the return extents of each conveyor;
    (h) an electronic control for each gear motor to cause this gear motor to move each plate-type conveyor with a speed-up, stop and, when required, a reverse movement, and terminating with a resulting advancing motion for delivery of the oriented product to the discharge end of the conveyor system;

(i) exiting conveyor means for receiving the oriented product from the troughing conveyor, and (j) a counting and ascertaining system at the end of the conveyor system insuring that an oriented product has been delivered to said exit conveyor means.

2. A troughing conveyor system as in claim 1 in which the inhibiting means at the end of the infeeding conveyor is a selectively-cycled plate member that is raised to impede advancement and delivery of a product to the troughing conveyor system while and when another product is still on the troughing conveyor system.

3. A troughing conveyor system as in claim 2 in which the cycled plate is raised only when the counting and ascertaining system determines that a product is still on the troughing conveyor system.

4. A troughing conveyor system as in claim 3 in which the counting and ascertaining system is an electric eye and detector counting means.

5. A troughing conveyor system as in claim 1 in which the electronic control for each gear motor includes bringing each of the conveyors to like speed and direction to deliver the oriented product to the exiting conveyor.

6. A troughing conveyor system as in claim 1 in which each plate-type conveyor includes rigid plastic flights.

7. A troughing conveyor system as in claim 1 in which the troughing apparatus includes carrying the upper extents by and on slide members which are in turn carried by longitudinal strength members hingedly retained to provide canting the conveyor top extents, these strength members carried by the support means.

8. A troughing conveyor system as in claim 7 in which the support means includes a pipe and channel iron arrangement.

9. A troughing conveyor system as in claim 1 in which the means for providing a convex arc in each canted upper conveyor extent includes a plurality of screw jacks on the inner and outer edge portions of each conveyor extent, each screw jack having a top end attached to a longitudinal support plate and a lower portion with a screw thread enabling selective adjustment of each screw jack carried in and movable in holes formed in a longitudinal rail member.

10. A troughing conveyor system as in claim 9 in which the longitudinal rail member is an angle iron attached to and carried by a support member.

11. A troughing conveyor system as in claim 1 in which both ends of the conveyor extents are provided with arcuate supports to insure that the plate-type conveyors are moved in the selected pathway.

12. A troughing conveyor system as in claim 11 in which there are two arcuate supports on each end of each of the conveyors and between these supports are positioned pulleys, these pulleys carried on shaft portions that are individually movable as to rotation and attitude.

13. A troughing conveyor system as in claim 12 in which the pulleys are split so as to be adjusted to provide selected widths.

14. A troughing conveyor system as in claim 1 in which each gear motor operatively and rotatably moves a driven pulley by and with a flexible timing belt or roller chain, the gear motor on its output shaft having a driving sprocket and a driven pulley is carried on and secured to an independent shaft having a mating driven sprocket, the flexible belt or chain engaging and being moved by the gea motor.

15. A troughing conveyor system as in claim 1 in which the return extent of each of the plate-type conveyors is slideable on and is carried by a support tray secured to the support means.

16. A troughing conveyor system as in claim 1 in which the infeed conveyor and the exiting conveyor are roller-type conveyors.

17. A troughing conveyor system as in claim 16 in which each roller-type conveyor is a powered roller conveyor.

18. A method of receiving a product such as a bag, box, carton and the like and, one at a time, orienting said received product and delivering said product in this desired oriented condition to an exiting receiving conveyor, said method including the steps of:

(a) arranging and providing an infeed conveyor so as to receive a product and delivering said product in the received position to an orienting conveyor system;

(b) mounting and selectively actuating an inhibiting stop positioned at the discharge end of said infeed conveyor, said actuation preventing unwanted delivery of the product to the orienting conveyor system only when an immediately prior product is in and on the orienting conveyor system;

(c) providing and positioning a pair of substantially alike plate-type conveyors in way of the discharge end of the infeed conveyor, said plate-type conveyors arranged in an endless and in a side-by-side array;

(d) troughing and forming the upper extents of said side-by-side conveyors, this troughing formed by tiliting the upper extent of each plate-like conveyor from an outer edge of the conveyor so that the pair of side-by-side conveyors forms a V-shape, said V-shaped trough angle from two to six degrees, and forming the upper extent in a raised arc, the arc arranged in a convex manner with the elevation at substantially the center of the upper extent, with thid raised portion from about two to less than six inches;

(e) moving each conveyor with its own gear motor and drive apparatus, the gear motors actuated to move the conveyors in response to electronic commands;

(f) sending electronic signals to each gear motor for rotational movement of the gear motor as to speed, direction, and/or stopping when and as required, thus providing the desired orientation of the product and eventually causing both gear motors to move both conveyors at the same speed to deliver the product to an exit conveyor, and (g) counting the incoming and exiting products so that only one product is carried by the troughed conveyors at any one time.

19. A method of orienting a product as in claim 18 which further includes supplying the plate-type conveyor flights of a rigid plastic and with each outer-end portion of said conveyor flights having support surfaces adapted for sliding and providing support plates disposed to engage each outer end of the flight, said support plates carried by screw jacks having threaded shanks adapted for mounting and adjustment to bow said support plates to a desired arc.

20. A method of orienting a product as in claim 18 which includes the further step of providing a counter at the entering end of the troughed conveyors and an electric-eye counter at the discharge end of the troughed conveyors so that a product therebetween said counters is noted and is actuated, inhibiting the entrance of a product from an infeed conveyor until that product on the troughed conveyors has been delivered to an exit conveyor and noted.

21. A method of orienting a product as in claim 20 which further includes supporting the troughed conveyors on a support frame of pipe and angle iron, with each conveyor carried on hinge means permitting adjustable tilting to a canted angle and adjusting the trough angle to suit the product to be oriented.

22. A troughing conveyor system as in claim 1 in which each plate-like conveyor is carried by front and rear pulleys, each of which is carried by a rotating shaft, each of which is mounted and carried by anti-friction bearings which are attached and carried by support members.

23. A troughing conveyor system for receiving a product such as a bag, box, carton and the like, and orienting said received product, one at a time, and delivering said product in a desired oriented condition to an exiting receiving conveyor, said troughing conveyor system including:
   (a) an infeed conveyor adapted to received a product and deliver said product to said troughing conveyor system;
   (b) inhibiting means at the end of the infeeding conveyor to prevent unwanted delivery of a product to the troughing conveyor system prior to a discharge of an immediately prior product from said troughing conveyor system, said inhibiting means activated only when unwanted delivery is present;
   (c) a support means for said troughing conveyor system;
   (d) a pair of substantially like plate-type conveyors arranged in an endless extent and in side-by-side array, these conveyors moved independently of each other by reversible gear motors and an associated drive means;
   (e) means for troughing the upper extents of said plate-type conveyors, said troughing resulting in a shallow included angle of substantially like degrees, the troughing forming by tilting each plate-type conveyor from an outer edge of the conveyor so that the pair of conveyors forms a V-shape;
   (f) a convex arc formed in each upper extent of said plate-type conveyor so that the product is engaged at a localized point, said convex arc produced by a plurality of screw jacks on the inner and outer edge portions of each conveyor extent, each screw jack having a top end attached to a longitudinal support plate and a lower portion with a screw thread enabling selective adjustment of each screw jack carried in and movable in holes formed in a longitudinal rail member;
   (g) means for guarding the drive apparatus and for carrying the return extents of each conveyor;
   (h) an electronic control for each gear motor to cause this gear motor to move each plate-type conveyor with a speed-up, stop and, when required, a reverse movement, and terminating with a resulting advancing motion for delivery of the oriented product to the discharge end of the conveyor system;
   (i) exiting conveyor means for receiving the oriented product from the troughing conveyor, and
   (j) a counting and ascertaining system at the end of the conveyor system insuring that an oriented product has been delivered to said exit conveyor means.

24. A troughing conveyor system as in claim 23 in which the longitudinal rail member is an angle iron attached to and carried by a support member.

25. A method df receiving a product such as a bag, box, carton and the like and, one at a time, orienting said received product and delivering said product in this desired oriented condition to an exiting receiving conveyor, said method including the steps of:
   (a) arranging and providing an infeed conveyor so as to receive a product and delivering said product in the received position to an orienting conveyor system;
   (b) mounting and selectively actuating an inhibiting stop positioned at the discharge end of said infeed conveyor, said actuation preventing unwanted delivery of the product to the orienting conveyor system only when an immediately prior product is in and on the orienting conveyor system;
   (c) providing and positioning a pair of substantially alike plate-type conveyors in way of the discharge end of the infeed conveyor, said plate-type conveyors arranged in an endless and in a side-by-side array, each plate-type conveyor flight of a rigid plastic and with each outer-end portion of said conveyor flights having support surfaces adapted for sliding, and providing support plates disposed to engage each outer end of the flight, said support plates carried by screw jacks having threaded shanks adapted for mounting and adjustment to bow said support plates to a desired arc;
   (d) troughing and forming the upper extents of said side-by-side conveyors, this troughing formed by tilting the upper extent of each plate-like conveyor from an outer edge of the conveyor so that the pair of side-by-side conveyors forms a V-shape, said V-shaped trough angle from two to six degrees, and forming the upper extent in a raised arc, the arc arranged in a convex manner with the elevation at substantially the center of the upper extent, with this raised portion from about two to less than six inches;
   (e) moving each conveyor with its own gear motor and drive apparatus, the gear motors actuated to move the conveyors in response to electronic commands;
   (f) sending electronic signals to each gear motor for rotational movement of the gear motor as to speed, direction, and/or stopping when and as required, thus providing the desired orientation of the product and eventually causing both gear motors to move both conveyors at the same speed to deliver the product to an exit conveyor, and
   (g) counting the incoming and exiting products so that only one product is carried by the troughed conveyors at any one time.

* * * * *